(12) United States Patent
Cronin et al.

(10) Patent No.: US 11,841,453 B2
(45) Date of Patent: Dec. 12, 2023

(54) NON-LINE-OF-SIGHT RANGING

(71) Applicant: Nokia Technologies Oy, Espoo (FI)

(72) Inventors: Harry Cronin, Cambridge (GB);
Christopher Wright, London (GB);
Phil Catton, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 114 days.

(21) Appl. No.: 17/697,672

(22) Filed: Mar. 17, 2022

(65) Prior Publication Data

US 2022/0308155 A1    Sep. 29, 2022

(30) Foreign Application Priority Data

Mar. 23, 2021 (EP) ..................... 21164131

(51) Int. Cl.
   *G01S 5/02* (2010.01)
   *G01S 5/00* (2006.01)
   *G06F 1/16* (2006.01)

(52) U.S. Cl.
   CPC .......... *G01S 5/0284* (2013.01); *G01S 5/0036* (2013.01); *G01S 5/021* (2013.01); *G06F 1/163* (2013.01); *G06F 1/1694* (2013.01)

(58) Field of Classification Search
   CPC ...... G01S 5/0284; G01S 5/0036; G06F 1/163; G06F 1/1694
   USPC ........................................................ 342/450
   See application file for complete search history.

(56) References Cited

U.S. PATENT DOCUMENTS

| | | | |
|---|---|---|---|
| 10,390,170 | B1 | 8/2019 | Karkkainen et al. |
| 2012/0191397 | A1* | 7/2012 | Eatwell ............... A61B 5/6803 73/1.79 |
| 2013/0222185 | A1 | 8/2013 | Ben Hamida et al. |
| 2019/0070058 | A1* | 3/2019 | Kurzweg ................. A61F 5/03 |
| 2019/0294166 | A1 | 9/2019 | Hill et al. |
| 2020/0064439 | A1 | 2/2020 | Przybyla et al. |
| 2020/0195833 | A1 | 6/2020 | Sivan |

(Continued)

FOREIGN PATENT DOCUMENTS

| | | | | |
|---|---|---|---|---|
| CA | 3030409 A1 | * | 7/2019 | ........... G01B 21/042 |
| CN | 104869585 B | * | 5/2018 | ............... G01S 11/06 |
| CN | 108601578 A | * | 9/2018 | ........... A61B 8/4245 |

(Continued)

OTHER PUBLICATIONS

US 10,219,097 B1, 02/2019, Karkkainen et al. (withdrawn)

(Continued)

*Primary Examiner* — Harry K Liu
(74) *Attorney, Agent, or Firm* — Nokia Technologies Oy

(57) ABSTRACT

According to various, but not necessarily all, embodiments there is provided an apparatus comprising means for: obtaining a position of a user device; locating one or more surfaces providing one or more putative reflection points for a non-line-of-sight (NLOS) path between the user device and a wearable device; conditional upon locating the one or more surfaces, causing ranging signals to be exchanged between the user device and the wearable device to determine a relative position of the wearable device with respect to the user device; determining, from at least the relative position and position of the user device, data that enables calibration of one or more sensors of the wearable device; and causing transmission of the data to the wearable device.

20 Claims, 4 Drawing Sheets

(56) References Cited

U.S. PATENT DOCUMENTS

2021/0067915 A1\* 3/2021 Mao ................ G01S 5/0273

FOREIGN PATENT DOCUMENTS

| CN | 111194424 A | \* | 5/2020 | ......... G02B 27/0093 |
| --- | --- | --- | --- | --- |
| EP | 3680687 A1 | | 7/2020 | |
| WO | 2016004537 A1 | | 1/2016 | |

OTHER PUBLICATIONS

"SPARK Audio apps note v2.5", Spark Microsystems, Retrieved on Mar. 7, 2022, Webpage available at : https://www.sparkmicro.com/wp-content/uploads/2020/03/SPARK-Audio-apps-note-v2.5.pdf.

Malajner et al., "UWB Ranging Accuracy", International Conference on Systems, International Conference on Systems, Signals and Image Processing (IWSSIP), Sep. 10-12, 2015, pp. 61-64.

Dotlic et al.,"Angle of Arrival Estimation Using Decawave DW1000 Integrated Circuits", 14th Workshop on Positioning, Navigation and Communications (WPNC), Oct. 25-26, 2017, 6 pages.

Marano et al.,"NLOS Identification and Mitigation for Localization Based on UWB Experimental Data", IEEE Journal on Selected Areas in Communications, vol. 28, No. 7, Sep. 2010, pp. 1026-1035.

Guo et al., "On the Accuracy of an Indoor Location-sensing Technique Suitable for Impulse Radio Networks", IEEE International Conference on Communications (ICC), Jun. 24-28, 2007, pp. 3987-3992.

Noes et al., " Benefits from Cooperation in Simultaneous Anchorless Tracking and Room Mapping based on Impulse Radio—Ultra Wideband Devices", 19th International Conference on Systems, Signals and Image Processing (IWSSIP), Apr. 11-13, 2012, pp. 17-21.

Ferlini et al. , "Head Motion Tracking Through in-Ear Wearables", EarComp'19: Proceedings of the 1st International Workshop on Earable Computing, Sep. 9, 2019, 6 pages.

Ledergerber et al.,"Ultra-Wideband Angle of Arrival Estimation Based on Angle-Dependent Antenna Transfer Function", Sensors (Basel), vol. 19, No. 20,Oct. 15, 2019, pp. 1-21.

"Startup promises wireless gaming devices without Bluetooth lag", cnet Tech, Retrieved on Mar. 21, 2022, Webpage available at : https://www.cnet.com/tech/mobile/startup-promises-uwb-wireless-gaming-devices-without-bluetooth-lag/.

Meissner et al., "UWB Positioning with Virtual Anchors and Floor Plan Information", 7th Workshop on Positioning, Navigation and Communication, Mar. 11-12, 2010, pp. 150-156.

Masini et al., "The Use of Meta-Surfaces in Vehicular Networks", Journal of Sensor and Actuator Networks, vol. 9, No. 1, Mar. 2020, pp. 1-18.

"IEEE Standard for Low-Rate Wireless Networks, Amendment 1: Enhanced Ultra Wideband (UWB) Physical Layers (PHYs) and Associated Ranging Techniques", IEEE 802.15.4-2020, IEEE Computer Society, 2020, 174 pages.

Extended European Search Report received for corresponding European Patent Application No. 21164131.1, dated Oct. 6, 2021, 7 pages.

\* cited by examiner

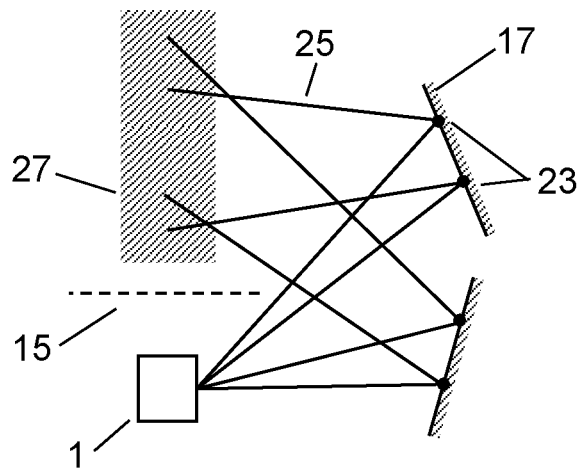
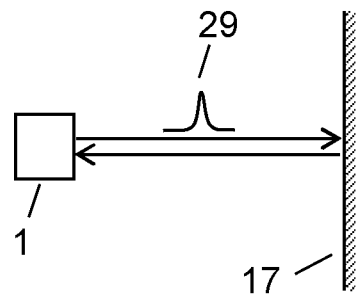
FIG 3
FIG 4
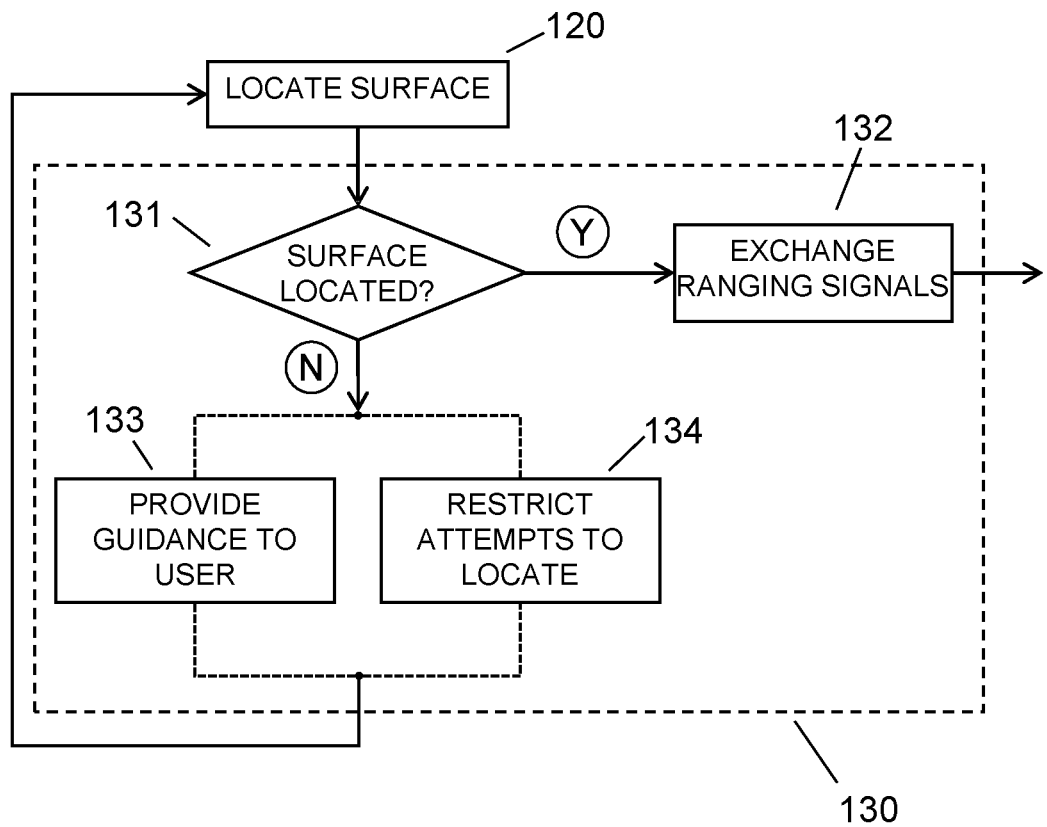
FIG 5

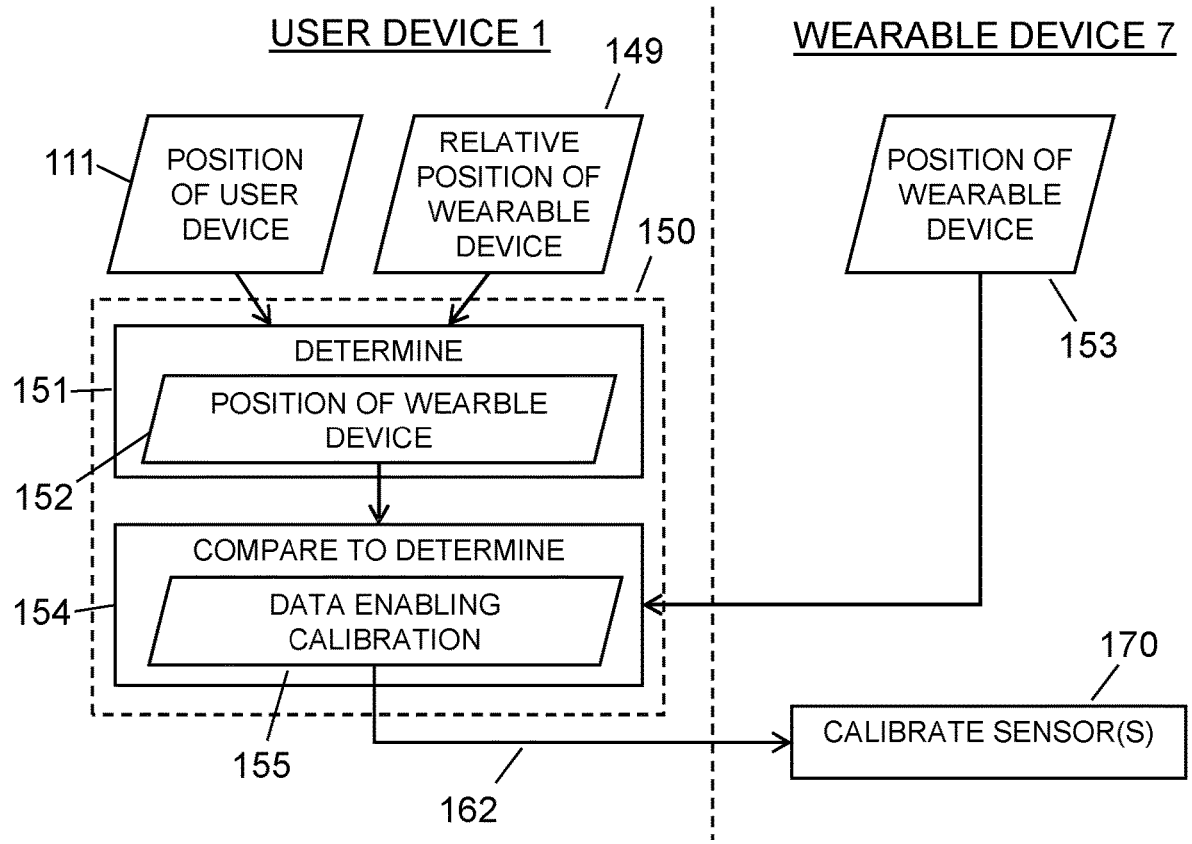
FIG 8
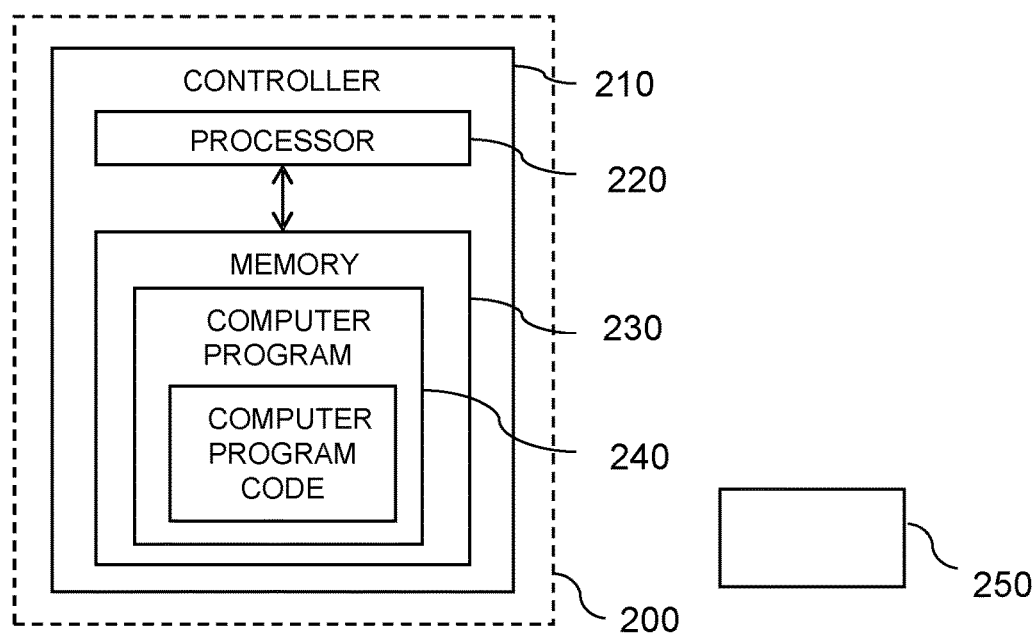
FIG 9
FIG 10

NON-LINE-OF-SIGHT RANGING

RELATED APPLICATION

This application claims priority to the European patent application number 21164131.1, filed on Mar. 23, 2021, the content of which is incorporated herein by reference in its entirety.

TECHNOLOGICAL FIELD

Embodiments of the present disclosure relate to non-line-of-sight ranging. Some relate to non-line-of-sight ranging to enable calibration of one or more sensors of a wearable device.

BACKGROUND

Sensors in wearable devices can be susceptible to sensor errors such as drift. This can be difficult to correct, due in part to the presence of one or more strong magnets comprised in the wearable devices. Strong magnets may be used in speaker drivers and charging alignment magnets, for example. Accordingly, tracking positions or motion of wearable devices using their internal sensors is challenging. This is limiting for a number of functions that the wearable devices may otherwise perform such as providing spatially-resolved output to the user in, for example, spatial audio, augmented or virtual reality applications.

BRIEF SUMMARY

According to various, but not necessarily all, embodiments there is provided an apparatus comprising means for: obtaining a position of a user device; locating one or more surfaces providing one or more putative reflection points for a non-line-of-sight (NLOS) path between the user device and a wearable device; conditional upon locating the one or more surfaces, causing ranging signals to be exchanged between the user device and the wearable device to determine a relative position of the wearable device with respect to the user device; determining, from at least the relative position and position of the user device, data that enables calibration of one or more sensors of the wearable device; and causing transmission of the data to the wearable device.

According to various, but not necessarily all, embodiments there is provided a system comprising a user device and a wearable device. The user device has one or more sensors configured to determine a position of the user device. The wearable device has one or more sensors. The system comprises means for: locating one or more surfaces providing one or more putative reflection points for a non-line-of-sight path between the user device and the wearable device; conditional upon locating the one or more surfaces, exchanging ranging signals between the user device and the wearable device to determine a relative position of the wearable device with respect to the user device; determining, from at least the relative position and position of the user device, data that enables calibration of the one or more sensors of the wearable device; and calibrating the one or more sensors of the wearable device using the data.

According to various, but not necessarily all, embodiments there is provided a method comprising: obtaining a position of a user device; locating one or more surfaces providing one or more putative reflection points for a non-line-of-sight (NLOS) path between the user device and a wearable device; conditional upon locating the one or more surfaces, causing ranging signals to be exchanged between the user device and the wearable device to determine a relative position of the wearable device with respect to the user device; determining, from at least the relative position and position of the user device, data that enables calibration of one or more sensors of the wearable device; and causing transmission of the data to the wearable device.

According to various, but not necessarily all, embodiments there is provided a computer program that, when run on a computer, performs: obtaining a position of a user device; locating one or more surfaces providing one or more putative reflection points for a non-line-of-sight (NLOS) path between the user device and a wearable device; conditional upon locating the one or more surfaces, causing ranging signals to be exchanged between the user device and the wearable device to determine a relative position of the wearable device with respect to the user device; determining, from at least the relative position and position of the user device, data that enables calibration of one or more sensors of the wearable device; and causing transmission of the data to the wearable device.

The following portion of this 'Brief Summary' section, describes various features that may be features of any of the embodiments described in the foregoing portion of the 'Brief Summary' section. The description of a function should additionally be considered to also disclose any means suitable for performing that function.

Locating the one or more surfaces may comprise detection of and ranging to the one or more surface using a pulsed signal.

Locating the one or more surfaces may comprise querying a spatial database.

Locating of the one or more surfaces may be initiated as a result of a determination that line-of-sight (LOS) communication between the user device and the wearable device is unavailable at a current time.

If, at a current user position, no surface providing a putative reflection point for a NLOS path between the user device and the wearable device is located, guidance may be caused to be provided to a user indicating one or more user positions at which one or more surfaces are expected to provide one or more reflection points for one or more NLOS paths between the user device and the wearable device.

If no surface providing a putative reflection point for a NLOS path between the user device and the wearable device is located, attempts to locate the one or more surfaces may be restricted until a change in user position occurs.

The ranging signals may comprise pulses having a repetition rate configured to reduce overlap of NLOS path responses to successive pulses in received signals.

The relative position of the wearable device with respect to the user device may be determined based on at least a NLOS path length and respective positions of one or more reflection points in the NLOS path.

Received signals may be processed to identify a component, indicative of a NLOS path response to a transmitted ranging signal, on which to perform ranging calculations to determine an NLOS path length.

Received signals may be processed to determine an angle of arrival associated with a component indicative of a NLOS path response to a transmitted ranging signal, and respective positions of one or more reflection points in a NLOS path may be determined based on the determined angle of arrival and the located one or more surfaces.

Ranging signals may be caused to be exchanged between the user device and a further wearable device to determine a relative position of the further wearable device with respect to the user device, wherein the two wearable devices have a known or expected positional relationship.

Position data from the one or more sensors of the wearable device may be obtained to determine error in the obtained position data from the one or more sensors of the wearable device using at least the relative position of the wearable device with respect to the user device and the position of the user device.

According to various, but not necessarily all, embodiments there is provided examples as claimed in the appended claims. The scope of protection sought for various embodiments of the invention is set out by the independent claims. The examples and features, if any, described in this specification that do not fall under the scope of the independent claims are to be interpreted as examples useful for understanding various embodiments of the invention.

BRIEF DESCRIPTION

Some examples will now be described with reference to the accompanying drawings in which:

FIG. 3 shows an example of subject-matter described herein;

FIG. 4 shows an example of subject-matter described herein;

FIG. 5 shows example portions of an example method;

FIG. 8 shows example portions in an example method;

FIG. 9 shows an example apparatus; and

FIG. 10 shows a delivery mechanism for an example computer program.

DETAILED DESCRIPTION

Examples of the disclosure relate to using non-line-of-sight (NLOS) ranging to determine a relative position of a wearable device 7 with respect to a user device 1. Determining this relative position enables calibration of one or more sensors 9 of the wearable device 7 based on the output of one or more sensors 3 of the user device 1.

Figure 1:
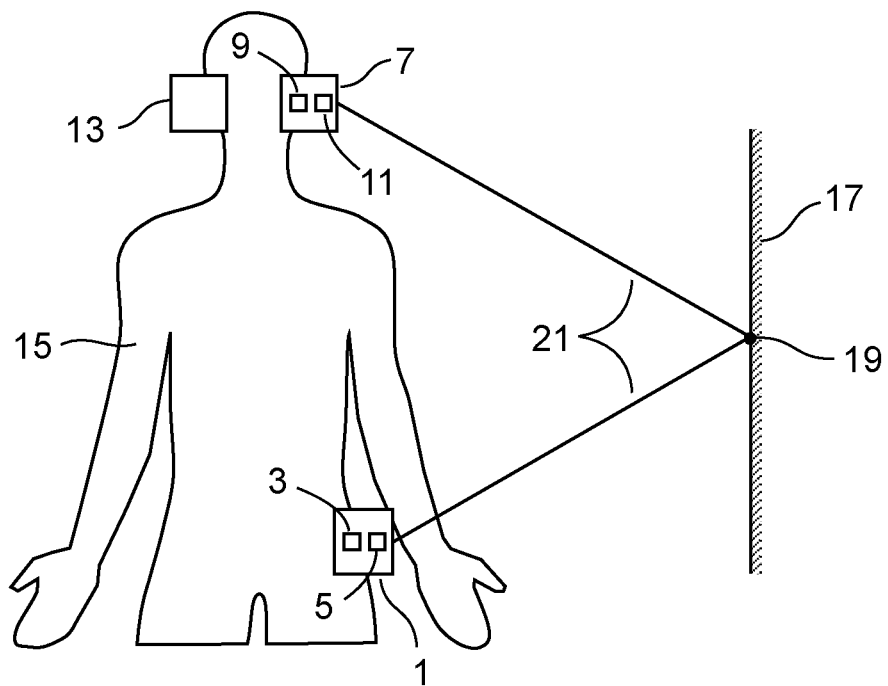
FIG. 1 shows an example of subject-matter described herein.

FIG. 1 illustrates an example of a user device 1, a wearable device 7, and a NLOS path 21 between them via reflection at a surface 17.

The user device 1 may be, for example and without limitation, a mobile phone or a portable computing device.

The user device 1, as shown, comprises one or more sensors 3. The one or more sensors 3 can comprise one or more position sensors.

The one or more position sensors can be configured to detect where the user device 1 is in three-dimensional space. They may comprise, for example, a Global Navigation Satellite System (GNSS) receiver.

Additionally or alternatively, the one or more position sensors can be configured to detect the orientation (e.g., pitch, yaw, and roll) of the user device 1. They may comprise, for example, an inertial measurement unit (IMU). The IMU can also be used in an inertial navigation system to track where the user device 1 is in three-dimensional space.

The user device 1, as shown, comprises at least one transceiver 5. The at least one transceiver 5 may comprise any suitable means for receiving and/or transmitting information.

Information that is transmitted could comprise ranging signals and data 155 enabling calibration of the one or more sensors 9 of the wearable device 7.

The information that is transmitted may be transmitted with or without local storage of the data in memory at the user device 1 and with or without local processing of the data by circuitry or processors at the user device 1.

Information that is received could comprise a NLOS path response to ranging signals transmitted by the wearable device 7.

The at least one transceiver 5 may comprise one or more transmitters and/or receivers. The at least one transceiver 5 may enable a wireless connection between the user device 1 and the wearable device 7. The wireless connection could be via short-range radio communications such as ultra-wideband (UWB). The transceiver 5 may, in such instances, be an UWB radio transceiver.

The user device 1 comprises associated processing hardware (not shown) for processing data reported by the one or more sensors 3 and by the transceiver 5. In some but not necessarily all examples, this processing hardware may be provided by the apparatus 200 described with reference to FIG. 9.

The wearable device 7 may be, for example and without limitation, headphones, earphones, or smart glasses.

The wearable device 7, as shown, comprises one or more sensors 9. The one or more sensors 9 can comprise one or more position sensors.

The one or more position sensors can be configured to detect the orientation (e.g., pitch, yaw, and roll) of the wearable device 7. They may comprise, for example, an inertial measurement unit (IMU). The IMU can also be used in an inertial navigation system to track where the wearable device 7 is in three-dimensional space.

It is to be appreciated that the output of the one or more sensors 9 may be less accurate than the output of the one or more sensors 3 of the user device 1, hence this is one reason why calibration of one or more sensors 9 based on the output of one or more sensors 3 of the user device 1 may be advantageous.

The wearable device 7, as shown, comprises at least one transceiver 11. The at least one transceiver 11 may comprise any suitable means for receiving and/or transmitting information.

Information that is transmitted could comprise ranging signals and data from the one or more sensors 9.

The information that is transmitted may be transmitted with or without local storage of the data in memory at the wearable device 7 and with or without local processing of the data by circuitry or processors at the wearable device 7.

Information that is received could comprise a NLOS path response to ranging signals transmitted by the user device 1 and data 155 enabling calibration of the one or more sensors 9.

The at least one transceiver 11 may comprise one or more transmitters and/or receivers. The at least one transceiver 11 may enable a wireless connection between the user device 1 and the wearable device 7. The wireless connection could be via short-range radio communications such as ultra-wideband (UWB). The transceiver 11 may, in such instances, be an UWB radio transceiver.

The wearable device 7 comprises associated processing hardware (not shown) for processing data reported by the one or more sensors 9 and by the transceiver 11.

In some applications of the wearable device 7, it may be configured to provide a spatially-resolved output to the user, relying on the calibrated one or more sensors 9. For such applications, the wearable device 7 can comprise suitable software and hardware for providing such outputs such as, for example, audio transducers and a suitable renderer for spatialising audio content delivered in an encoded form (e.g., using a spatial audio codec such as Immersive Voice and Audio Services (IVAS)) to provide spatial audio to the user.

Line-of-sight (LOS) between the user device 1 and wearable device 7 is obstructed by a LOS obstruction 15, which is the user's body in the example of FIG. 1 but can be other objects in other examples.

There is shown an example of a NLOS path 21 between the user device 1 and wearable device 7 over which ranging signals and other data transfer signals can be exchanged. A surface 17 provides a reflection point 19 in the NLOS path 21. The surface 17 may be one external to either device 1, 7 and part of the real-world, thus capable of reflecting signals, be they electromagnetic or acoustic, exchanged between the devices 1, 7. The surface 17 need not be separate to the user's body however. In some examples, the surface 17 may be provided by a body part.

It is to be appreciated that the shown NLOS path 21 may be one of multiple between the user device 1 and wearable device 7. Some of the multiple NLOS paths may be single-reflection NLOS paths via reflection at other surfaces 17 like the one shown. Some of the multiple NLOS paths may be multiple-reflection NLOS paths via reflection at multiple surfaces 17. NLOS ranging may be performed over any of the multiple NLOS paths. NLOS ranging may be performed over multiple NLOS paths, with the results used to improve the reliability of the calibration of one or more sensors 9 of the wearable device 7. For example, the relative positions determined from NLOS ranging over multiple NLOS paths can be averaged to improve reliability.

A further wearable device 13 is shown and NLOS ranging to determine a relative position of the further wearable device 13 with respect to a user device 1 may also be performed in an analogous manner as for the wearable device 7, however this is by no means essential for enabling calibration of one or more sensors 9 of the wearable device 7.

Where a relative position of the further wearable device 13 is determined and where the further wearable device 13 has a known or expected positional relationship with the wearable device 7, the difference between two relative positions determined from the NLOS ranging can be compared with the known or expected positional relationship as a form of calibration of the NLOS ranging approach to determining position, and thus to improve the accuracy of the approach. Similarly, if the wearable device 7 comprises multiple transceivers 11 a known distance apart, this distance can be compared to relative positions determined from NLOS ranging with the different transceivers 11.

For example, if the wearable device 7 and the further wearable device 13 are a pair of earphones, there is a high probability that they will be in each ear of the user and thus a predictable distance apart with a predictable relative orientation to each other. The distance between them may be measured from the through-head radio frequency delay.

Figure 2:
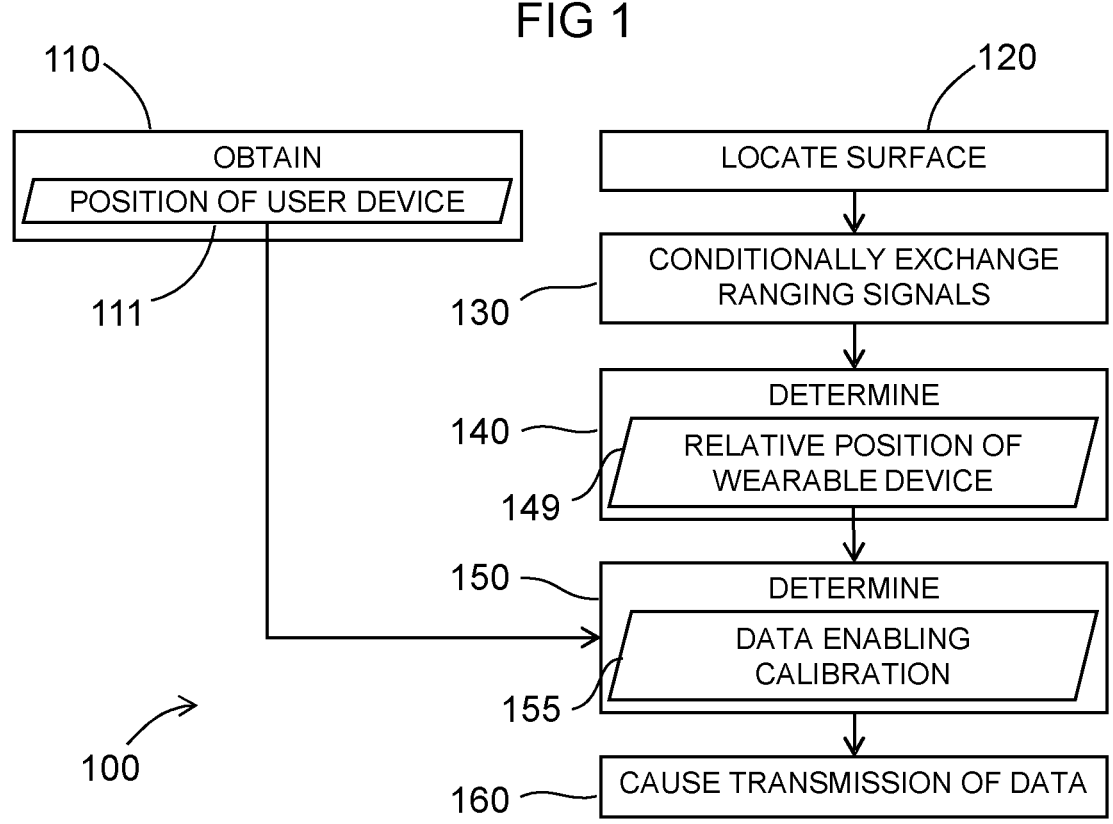
FIG. 2 shows an example method.

FIG. 2 illustrates a method 100 for determining a relative position 149 of a wearable device 7 with respect to a user device 1 to enable calibration of one or more sensors 9 of the wearable device 7. Method 100 uses NLOS ranging opportunistically, making use of surfaces 17 in the local environs of the devices 1, 7 to establish NLOS communication between the devices 1, 7.

At block 110 of method 100 a position 111 of the user device 1 is obtained.

The position 111 can be obtained by: receiving position data reported by the one or more sensors 3 of the user device 1; or processing data reported by the one or more sensors 3 of the user device 1 to obtain position data.

At block 120 of method 100 one or more surfaces 17 which provide one or more putative reflection points 23 for a NLOS path 25 between the user device 1 and the wearable device 7 are located. Reference is made here to FIG. 3, which shows several putative reflection points 23 for NLOS paths 25.

Locating involves discovering the existence of a specified something, in this case one or more surfaces 17, and determining the position of that specified something. The surface's position 145 may be defined relative to the user device 1 and parameterised in terms of a direction and a distance.

Locating one or more surfaces 17 which provide one or more putative reflection points 23 for a NLOS path 25 between the user device 1 and the wearable device 7 can therefore comprise determining if there is any such surface 17 and where that surface 17 is relative to the user device 1.

The locating of one or more surfaces 17 at block 120 does not necessarily involve determining where any such putative reflection point 23 is. That the located surface 17 is to be one providing one or more putative reflection points 23 for a NLOS path 25 between the devices 1, 7 sets constraints on the position of the surface 17. That is, more surfaces may be discovered to exist than surfaces 17 which provide one or more putative reflection points 23 for a NLOS path 25 between the devices 1, 7.

A putative reflection point 23 for a NLOS path 25 between the devices 1, 7 is a point which is believed to be the (or one of the) reflection point(s) in a NLOS path between the devices 1, 7, but where this is not definitely the case. It may not definitely be the case because the position of the wearable device 7 and, thus the NLOS path, are yet to be reliably determined.

A point may be believed to be the (or one of the) reflection point(s) in a NLOS path between the user device 1 and the wearable device 7 if a signal emitted from the user device 1 incident at that point would be reflected towards positions 27 where the wearable device 7 would be expected. This can be expressed in terms of maximum and minimum angles through which the signal incident at this point may be reflected. This can also be expressed in terms of maximum and minimum distance between the reflected signal and the user device 1 at closest approach. The positions 27 where the wearable device 7 would be expected can also be based upon a reported position of the wearable device 7 by one or more sensors 9 of the wearable device 7. As this may not be considered reliable, the expected positions 27 may be ones within a threshold distance of the reported position. The positions 27 where the wearable device 7 would be expected can also be based upon the last-known position of the wearable device 7.

FIG. 3 shows several NLOS paths 25 between the user device the user device 1 and expected positions 27 of the wearable device 7, each involving reflection at a putative reflection point 23 on a surface 17. Since it is not definitely known that these NLOS paths 25 extend between the user device 1 and the wearable device 7, only that they extend between the user device 1 and expected positions of the wearable device 7, these NLOS paths 25 can be termed putative NLOS paths 25 between the user device 1 and the wearable device 7. Therefore, said differently, block 120 can comprise locating one or more reflective surfaces 17 providing putative NLOS paths 25 between the user device 1 and the wearable device 7. Provided that the wearable device 7 is where it is expected to be, at least one of these putative NLOS paths 25 will be an NLOS path 21 between the user device 1 and the wearable device 7 as shown in FIG. 1.

In some examples, a plurality of surfaces 17 are located at block 120.

The located plurality of surfaces 17 can provide a plurality of putative reflection points 23 for a single NLOS path 25 between the user device 1 and the wearable device 7. A NLOS path having a plurality of reflection points may be sought if, for example, no surfaces are located which enable a NLOS path with a single reflection point.

The located plurality of surfaces 17 can provide putative reflection points 23 for a plurality of NLOS paths 25 (whether containing one or more reflection points each) between the user device 1 and the wearable device 7. This enables a relative position of the wearable device 7 with respect to the user device 1 to be determined (at block 140) over a plurality of different NLOS paths to reduce error via averaging.

The located plurality of surfaces 17 can provide putative reflection points 23 for a plurality of NLOS paths (whether containing one or more reflection points each) between the user device 1 and multiple wearable devices 7, 13 or multiple transceivers 11 of a single wearable device 7.

At block 130 of method 100, conditional upon locating the one or more surfaces 17 in block 120, ranging signals are caused to be exchanged between the user device 1 and the wearable device 7 to determine (at block 140) a relative position 149 of the wearable device 7 with respect to the user device 1.

Method 100 in this way makes use of opportunities to calibrate (or at least enable calibration of) the one or more sensors 9 of the wearable device 7 when a suitable reflective surface 17 can be located but does not attempt to perform steps towards this calibration when it appears unfeasible in light of no suitable reflective surfaces 17 being located. In this manner, power consumption may be reduced.

Ranging signals are signals which enable a distance between the devices which exchange them to be determined. A ranging signal may be encoded with an indication of its time of transmission to enable time of flight to be determined based on its time of arrival. A ranging signal may also comprise a signal which, upon reception by a device, triggers that device to transmit a signal which is thusly encoded. A ranging signal may also comprise a signal by which a distance determined at one device is reported to the other device.

The NLOS path 21 over which the ranging signals are exchanged may be one of the putative NLOS paths 25. The determination of the relative position as is described with reference to FIG. 6 below is based on the expectation that the NLOS path 21 is one of the putative NLOS paths 25.

Ranging signals can also be exchanged between the user device 1 and the further wearable device 13 (or another transceiver 11 of the wearable device 7) to determine the relative position of the further wearable device 13 (or of the another transceiver 11 of the wearable device 7) with respect to the user device 1. This can be performed sequentially with the exchanging of ranging signals with the wearable device 7.

At block 150 of method 100 data 155 that enables calibration of one or more sensors 9 of the wearable device 7 is determined from at least the relative position 149 of the wearable device 7 with respect to the user device 1 (from block 140) and the position 111 of the user device 1 (from block 110). At block 160 of method 100 transmission of the data 155 to the wearable device 7 is caused.

In some examples, the user device 1 may be assumed to be about the user's person (for example in pockets of their clothes or in bags such as handbag or backpack) or otherwise placed upon a proximate horizontal surface, whereas the wearable device 7 may, for example, be disposed on the user's limbs or head. Accordingly, movement of the user device 1 is not likely to be strongly correlated with movement of the wearable device 7. For example, the user turning their head through a large angle or making a large gesture with an arm may result in significant movement of the wearable device 7, resulting in significant drift of the one or more sensors 9, while the user device 1 is substantially unmoved. Therefore, method 100 (or at least blocks 120 onwards) may be performed after significant movement of the wearable device 7 has been detected and in response to said detection, though it is to be appreciated that the method may not be performed in response to every such detection of significant movement. Significant movement may be movement over a path which exceeds a threshold length or movement exceeding a threshold velocity. In some examples the method 100 (or at least blocks 120 onwards) may be performed after significant movement of the wearable device 7 with respect to the user device 1 has been detected and in response to said detection.

Examples of blocks 110 to 160 of method 100 are described with reference to FIGS. 4 to 8.

FIG. 4 illustrates an example of locating the one or more surfaces 17, as per block 120. In this example locating the one or more surfaces 17 comprises detection of and ranging to the one or more surfaces 17 using a pulsed signal 29. The pulsed signal 29 can comprise an impulse waveform (as shown) or can comprise a continuous wave, modulated in the frequency domain by a pulse wave.

The pulsed signal may be a radio frequency signal such as UWB. The locating can be performed by a UWB radar system or by a UWB localisation system in which the user device node is controlled to establish a connection with itself to act as both tag (leader) and anchor (follower). Other radio technologies such as mmWave can be used as an alternative to UWB. Non-electromagnetic signals such as pulsed acoustic or ultrasound signals can be used as alternatives.

The user device 1 is caused to emit the pulsed signal 29 and receive reflections of this signal. Processing the received reflections obtains a time of flight and, from this, a distance to a surface 17 at which the signal 29 was reflected. The angle of arrival of the received reflection is a normal to the surface 17, thus the relative orientation of the surface 17 is also inferred from processing the received reflection.

The reflective characteristics of a surface can be determined from the amplitude of reflections of the pulsed signal 29 given a known power with which the pulsed signal 29 was emitted and given the obtained distance to the surface. If the reflective characteristics of a surface indicate that it is not a sufficiently strong reflector, that surface may not be counted among the one or more surfaces 17 providing one or more putative reflection points 23 for an NLOS path 25 between the devices 1, 7.

In some examples the planar extent of the one or more surfaces 17 is determined by processing the received reflections of pulsed signals 29 emitted over a range of angles to determine consistent reflections over a range of angles of arrival. However, the planar extent of the one or more surfaces 17 need not be determined at this stage and sufficient planar extent for the purpose of providing a putative reflection point 23 in an NLOS path 25 between the devices 1, 7 can be assumed.

In this example, at block 120, method 100 comprises causing the user device 1 to emit the pulsed signal and to process the received reflection to locate the one or more surfaces 17.

As an alternative to locating the one or more surfaces 17 by transmitting a pulsed signal 29 and processing received reflections, locating the one or more surfaces 17 can comprise querying a spatial database. The spatial database can be queried according to the obtained position 111 of the user device 1 (from block 110) and, in some examples, expected positions 27 of the wearable device 7. The spatial database can comprise geometry data mapping three-dimensional objects proximate the obtained position 111 of the user device 1. The query results may identify one or more surfaces 17 of the three-dimensional objects which provide putative reflection points 23 for NLOS paths 25 between the devices 1, 7 and return the position(s) of the same.

In some examples, regardless of the method of locating the one or more surfaces 17, the locating is conditional upon the absence of a LOS between the devices 1, 7 or upon the presence of a LOS obstruction 15. Locating of the one or more surfaces 17 is initiated as a result of a determination that LOS communication between the user device 1 and the wearable device 7 is unavailable at a current time. As a result, power consumption is reduced as attempts to locate the one or more surfaces 17 which will enable NLOS ranging (either by causing transmission of a pulsed signal 29 or by submitting a query to a spatial database) are not made when LOS ranging is possible.

In some examples, the locating of block 120 may be initiated upon detection of a defined gesture by a user, for example, extending their hand away from their body so that it can provide a reflective surface 17 providing putative NLOS paths 25 between the devices 1, 7. The user may be able to personalise these gestures.

FIG. 5 illustrates an example of continuations of method 100 if no surface providing a putative reflection point 23 for a NLOS path 25 between the user device 1 and the wearable device 7 is located at block 120.

A conditional operation at sub-block 131 determines which one of the two paths Y and N method 100 will follow. Path Y is followed if one or more surfaces 17 which provide one or more putative reflection points 23 for a NLOS path 25 between the user device 1 and the wearable device 7 are located at block 120. Path N is followed if no surface providing a putative reflection point 23 for a NLOS path 25 between the user device 1 and the wearable device 7 is located at block 120.

Sub-block 132 is comprised in path Y and, at sub-block 132, ranging signals are caused to be exchanged between the devices 1, 7. The continuation of path Y is block 140 and blocks 150 and 160 thereafter.

Path N does not comprise sub-block 132 and thus does not cause the exchange of ranging signals between the devices 1, 7. Power consumption may therefore be reduced when it is not apparent that NLOS ranging will be possible.

In some examples, path N comprises sub-block 133. At sub-block 133 guidance is caused to be provided to a user indicating one or more user positions at which one or more surfaces are expected to provide one or more reflection points for NLOS paths between the user device 1 and the wearable device 7. Therefore, if, at a current user position, no surface providing a putative reflection point 23 for a NLOS path 25 between the user device 1 and the wearable device 7 is located, method 100 can comprise causing provision of guidance to the user indicating one or more user positions at which one or more surfaces are expected to provide one or more reflection points for NLOS paths between the user device 1 and the wearable device 7.

The guidance can be provided via the user device 1 and/or wearable device 7 and method 100 can comprise causing respective devices 1, 7 to do so.

The user positions can comprise a place in three-dimensional space and/or a pose. The one or more user positions indicated by the guidance can be determined based on the locating of other surfaces besides those providing putative reflection points 23 for NLOS paths 25 between the devices 1, 7 during attempts to locate the one or more surfaces 17 which do at block 120.

The guidance can indicate to a user to change their place in three-dimensional space. This can allow a user to deliberately re-calibrate the wearable device 7 via standing or moving near to a suitable surface 17 such as a wall.

The guidance can indicate to a user to vary their pose. In some examples this can comprise guiding the user to move a part of their body so that it can provide a reflective surface 17 for putative NLOS paths 25 between the devices 1, 7. For example, a user's hand held at arm's length could provide such a surface 17.

In some examples, path N comprises sub-block 134. At sub-block 134 attempts to locate the one or more surfaces 17 are restricted until a change in user position occurs. Therefore, if no surface providing a putative reflection point 23 for a NLOS path 25 between the user device 1 and the wearable device 7 is located, method 100 can comprise restricting attempts to locate the one or more surfaces 17 until a change in user position occurs. The attempts may be restricted until there is a change in the user position by a threshold amount.

Restricting attempts can comprise reducing the number of further attempts or preventing further attempts. This may further reduce power consumption.

Where the locating of block 120 comprises transmitting a pulsed signal 29 and processing received reflections, restricting attempts may be subject to additional constraints such as there having been a specified number of failed attempts to locate a suitable surface 17 in a specified time period.

Where the locating of block 120 comprises querying a spatial database, restricting attempts may be subject to additional constraints such as determining that there will be no likely candidates for suitable surfaces 17 in the geometry data because, for example, the user is currently in an open space. Where the locating of block 120 comprises querying a spatial database, the threshold amount by which the user position must change to lift the restrictions may be commensurate with a change in the user's place in three-dimensional space that requires a new set of geometry data to be accessed.

In some examples, path N comprises both sub-blocks 133 and 134. The user can be provided guidance on how to change user position and attempts to perform the locating of block 120 restricted until such change in user position has been substantially made.

Figure 6:
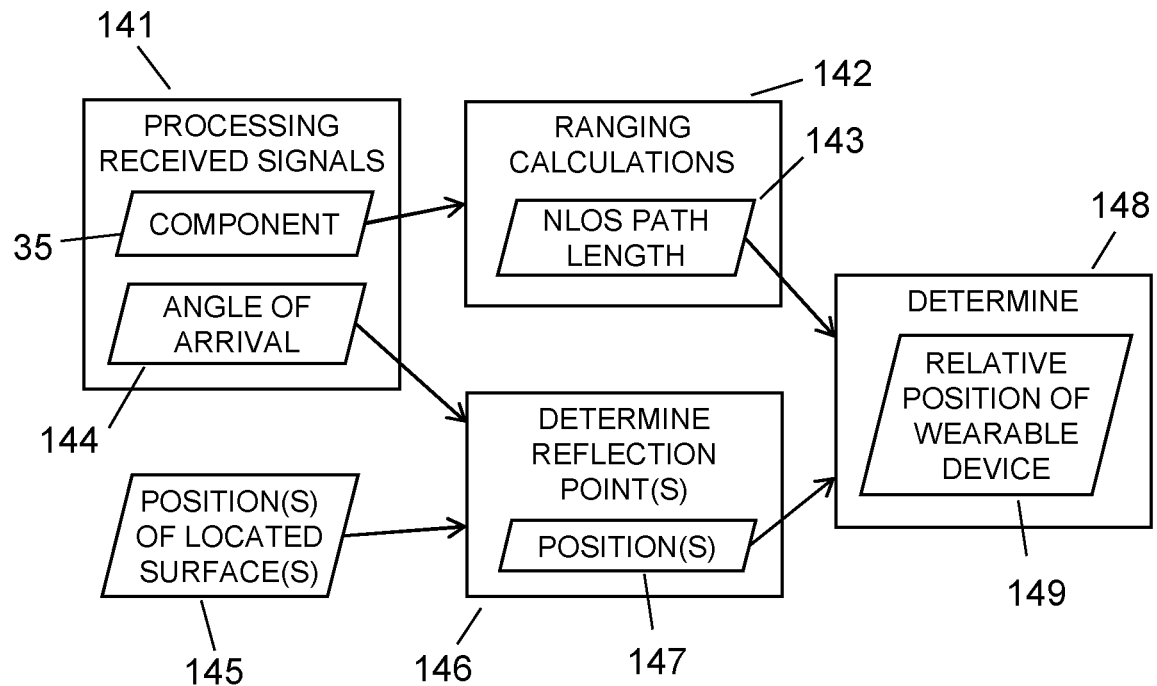
FIG. 6 shows example portions of in an example method.

FIG. 6 illustrates an example of determining a relative position 149 of the wearable device 7 with respect to the user device 1, as per block 140.

The relative position 149 of the wearable device 7 with respect to the user device 1 is determined based on at least a NLOS path length 143 and respective positions 147 of one or more reflection points 19 in the NLOS path 21.

When ranging signals are exchanged the received signals at each device 1, 7 will be processed in order to enable a relative position 149 of the wearable device 7 with respect to the user device 1 to be determined. At sub-block 141, the received signals are processed. This processing can comprise identifying a component 35 of the received signals which is indicative of a NLOS path response to a transmitted ranging signal. This is further described with reference to FIG. 7 below. This processing can comprise determining an angle of arrival 144 associated with the identified component 35. The angle of arrival 144 can be determined using, for example, dual (or more) receivers or a single receiver in conjunction with a predictive model of angle-dependent distortions in a path response. In some examples the predictive model can be developed via a machine learning approach. For example, the predictive model can be trained using supervised machine learning on a large dataset of path response measurements paired with the corresponding angle of arrivals.

At sub-block 142 ranging calculations are performed using the identified component 35. The NLOS path length 143 for the NLOS path 21 over which the ranging signals are exchanged is determined by the ranging calculations.

In some examples, two-way ranging is used. The user device 1 is caused to transmit a ranging signal comprising an initialisation message and to record, at least temporarily, the time of transmission. The wearable device 7 records the time at which it receives the initialisation message and transmits a ranging signal comprising an acknowledgement message. The acknowledgement message comprises information about the time taken to generate the acknowledgement after the initialisation message was received. The round-trip time is calculated once the user device 1 has received the acknowledgement message. Subtracting the time taken to generate the acknowledgement from the round-trip time gives the two-way time-of-flight. Half of that gives the one-way time-of-flight, enabling a path length to be determined. Provided that the round-trip time is based on the time of arrival of a component 35 of the received signals which is indicative of a NLOS path response, the NLOS path length 143 will be calculated. However, it is to be appreciated that if there is only a low degree of multipath interference, signal processing to filter low strength components may be used instead of processing configured to identify this component from amongst many comprised in the received signals.

In some examples, double-sided two-way ranging is used in which, once the user device 1 has received the acknowledgement message, it is caused to transmit a further ranging signal comprising a further acknowledgement message. The further acknowledgement message comprises information about the time taken to generate the further acknowledgement and its receipt by the wearable device 7 allows the wearable device 7 to also calculate the NLOS path length 143. Comparison or averaging of the NLOS path lengths 143 determined respectively by the user device 1 and the wearable device 7 enables improved reliability in the determination of the NLOS path length 143.

At sub-block 146 respective positions 147 of one or more reflection points 19 in a NLOS path 21 are determined based on at least the determined angle of arrival 144 and the located one or more surfaces 17 (from block 120).

If a plurality of suitable surfaces 17 were located at block 120, comparing the angle of arrival 144 with the positions 145 of the located surfaces enables the one or more surfaces 17 which provide the one or more reflection points 19 in the NLOS path 21 to be determined. In some examples, if the planar extent of the located surfaces 17 was not previously determined at block 120 of method 100, comparing the angle of arrival 144 with the positions 145 of the located surfaces 17 can comprise checking whether the angle is consistent with the identified component 35 having reflected from a position to where it is assumed that a located surface 17 will extend if it is planar. If, by assuming the planar extent of located surfaces 17, more than one located surface 17 would occupy the angular position in space from which the component 35 arrives at the user device 1 such that it cannot be determined at which of these surfaces 17 the reflection may have occurred, the relative position 149 of the wearable device 7 with respect to the user device 1 may be calculated using the position 145 of each of these surfaces to determine which yields a more realistic result for the relative position 149. Determining which yields a more realistic result for the relative position 149 can be based on considerations of realistic human geometry (anatomy), motion, and behaviour, with examples being given later in this description.

If the reflective characteristics of the surfaces 17 are determined when performing the locating of block 120, then additionally or alternatively, the amplitude of the identified component 35 can be assessed using, at least in part, the determined reflective characteristics of the surfaces 17 to determine which one or more surfaces 17 provided the one or more reflection points 19 in the NLOS path 21.

Using the surfaces' position(s) 145, their respective orientation, and the angle of arrival 144, the relative position 147, with respect to the user device 1, of respective one or more reflection points 19 can be calculated using trigonometric relations. Subtracting the distance between the user device 1 and the reflection point 19 (and the distances between successive reflection points 19 if the NLOS path 21 is a multiple-reflection path) from the NLOS path length 143 leaves the distance from the final reflection point 19 to the wearable device 7 and thus enables the relative position 149 of the wearable device 7 with respect to the user device 1 to be determined, as per sub-block 148.

Figure 7:
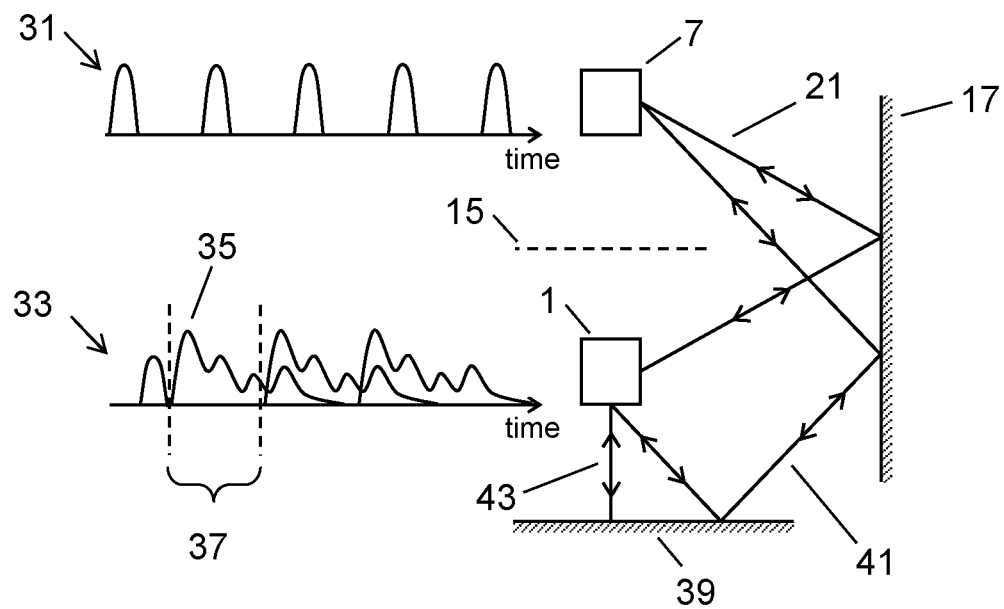
FIG. 7 shows an example of subject-matter described herein.

FIG. 7 illustrates an example of transmitted ranging signals and identification of a component 35 which is indicative of a NLOS path response to a transmitted ranging signal.

In the example of FIG. 7, but not necessarily all examples, the transmitted ranging signal is a pulsed signal 31. Data such as the initialisation message and acknowledgement message can be encoded by pulse amplitude modulation, pulse position modulation, on-off keying or other suitable modulation schemes including those permitted in IEEE 802.15.4z-2020. For example, the transmitted ranging signal may use nanosecond pulses according to the UWB impulse radio technique. In other examples, the pulsed signal 31 may be an acoustic signal. Frequency modulation can be applied to the pulsed signal if relative velocities between the devices 1, 7 are also sought.

In FIG. 7, the wearable device 7 is shown as transmitting a ranging signal and the user device 1 receiving a signal 33 comprising at least one path response to the transmitted pulsed signal 31. It is to be appreciated, however, that the user device 1 can likewise transmit such a ranging signal, for example, in two-way ranging as described in the foregoing.

The signals received by the user device 1 (as shown in FIG. 7, but also by the wearable device 7 in some examples) can be subject to multipath interference. For example, as shown in FIG. 7, the same surface 17 can enable a single-reflection NLOS path 21 as well as, in conjunction with a further surface 39 such as the floor, a multiple-reflection NLOS path 41. Since the user device 1 may also be transmitting during the same period, there may be further interference from reflections 43 of the signals emitted by the user device 1.

To make it easier to identify, from the received signal 33, a component 35 which is indicative of a NLOS path response to the transmitted pulsed signal 31, overlap of the multipath responses to each pulse of the transmitted pulsed signal 31 should be reduced. Accordingly, in some examples the pulses have a repetition rate configured to reduce overlap of NLOS path responses to successive pulses in received signals 33.

To do so, in some examples, the ranging signals can be transmitted in the low rate pulse (LRP) mode of UWB as defined in IEEE 802.15.4z-2020. Data transfer between the devices 1, 7 may be carried out in the high rate pulse (HRP) mode of UWB as defined in IEEE 802.15.4z-2020, with the mode being switched to LRP in response to the location (at block 120) of one or more surfaces 17 providing one or more putative reflection points 23 for a NLOS path 25 between the device 1, 7.

In other example, the ranging signals may be transmitted with a pulse repetition rate based, at least in part, on an expected length of an NLOS path 21 between the devices 1, 7 via reflection at at least one of the located one or more surfaces 17. The pulse repetition rate may be based on an estimate of the temporal distribution of NLOS path responses to a single pulse that would be expected in the received signal 33. The estimated temporal distribution can be calculated from multiple putative NLOS paths 25 that can be identified based on the located one or more surfaces 17 and their respective path lengths.

In some examples the pulse repetition rate is also based on the real-time data transfer requirements including, for example, the size of data to be transferred for performance of application tasks distributed between the user device 1 and wearable device 7. While having a lower pulse repetition rate is advantageous, it may also make the NLOS ranging slower. It is, however, to be appreciated that since lower pulse repetition rates can be less computationally intensive if they result in no, or substantially no, overlap of the multipath responses to each pulse of the transmitted pulsed signal 31, the overall time to perform NLOS ranging can be similar or even shorter than with higher pulse repetition rates. Nevertheless, if the NLOS ranging is too slow, there won't be enough time to transfer the required data, even using a higher pulse repetition rate, during intervening periods. Thus, the real-time data transfer requirements can impose a constraint on the minimum pulse repetition rate.

In the example of FIG. 7 the path response to the transmitted ranging signal (e.g., the pulsed signal 31) which corresponds to one NLOS path is one amplitude peak in the received signals 33. The component 35 indicative of an NLOS path response to the transmitted ranging signal (e.g., the pulsed signal 31) is an amplitude peak. As a result of multipath interference, multiple and overlapping amplitude peaks may be observed. Identifying the component 35 on which to perform the ranging calculations of sub-block 142 to determine the NLOS path length 143 can therefore comprise identifying a suitable amplitude peak.

Though the ranging calculations of sub-block 142 and the determination, at sub-block 148, of the relative position 149 of the devices 1, 7 can be performed on the components of the received signals 33 indicating a multiple-reflection NLOS path, there are increased uncertainties as a result of having to determine the positions 147 of more reflection points 19. Therefore, in some examples the received signals 33 are processed to identify a component 35 indicative of a single-reflection NLOS path response to the transmitted ranging signal (e.g., the pulsed signal 31).

In some examples, identifying a component 35 indicative of a single-reflection NLOS path response to the transmitted ranging signal (e.g., the pulsed signal 31) may be based on features of an amplitude peak which distinguish single-reflection NLOS path responses from no-reflection NLOS path responses (e.g., NLOS via diffraction around, or other interference with, the LOS obstruction 15) and multiple-reflection NLOS path responses.

Single-reflection NLOS path responses may be distinguished from multiple-reflection NLOS path responses based on having a relatively higher amplitude peak and/or arrival sequence with single-reflection NLOS paths typically being shorter and thus arriving earlier.

Single-reflection NLOS path responses may be distinguished from no-reflection NLOS path responses based on relatively low distortion, said distortion arising in the no-reflection NLOS path responses due to the interaction with the LOS obstruction 15.

In some examples, identification of a component 35 indicative of a single-reflection NLOS path response to the transmitted ranging signal (e.g., the pulsed signal 31) can be improved by filtering the received signal 33 within a realistic time-of-arrival window 37. The window 37 can be calculated based on the obtained position 111 of the user device 1, the expected position 27 of the wearable device 7, and the located surfaces' positions 145.

If more than one suitable amplitude peak is identified, then the ranging calculations of sub-block 142 and the determination, at sub-block 148, of the relative position 149 of the devices 1, 7 can be performed on each of the suitable amplitude peaks to determine which yields a more realistic result for the relative position 149. Determining which yields a more realistic result for the relative position 149 can be based on considerations of realistic human geometry (anatomy), motion, and behaviour. For example: if the wearable device 7 is a head-worn device, relative positions 149 which place the user device 1 above the wearable device 7 may be rejected. For example: relative positions 149 which place the user device 1 and the wearable device 7 at an unrealistic distance from one another, such as more than the user's height or arm span, may be rejected, it being assumed that the user device 1 is about the user's person (for example in pockets of their clothes or in bags such as handbag or backpack) at the time of the NLOS ranging. For example: relative positions 149 which differ from previously determined results of method 100 by an amount which implies an unrealistically fast speed of human motion may be rejected.

FIG. 8 illustrates an example of determining data 155 that enables calibration of one or more sensors 9 of the wearable device 7, as per block 150, and a continuation of method 100, which continuation is performed at the wearable device 7 to calibrate the one or more sensors 9.

At sub-block 151 the position 152 of the wearable device 7 is determined using the obtained position 111 of the user device 1 and the determined relative position 149 of the wearable device 7 with respect to the user device 1.

This position 152, determined according to the above described NLOS ranging approach, is considered to be more accurate than the position 153 of the wearable device 7 reported by its own one or more sensors 9. Thus, calibration of the one or more sensors 9 of the wearable device 7 can be based on the determined position 152 so as to bring the position 153 determined by the one or more sensors 9 into agreement with the determined position 152.

In the example of FIG. 8, data (e.g., the position 153 of the wearable device 7 reported by its own one or more sensors 9) is obtained from the wearable device 7 to determine error in this data. This data can be obtained by causing transmission of a request for this data to the wearable device 7, whereupon, in this example, said data is transmitted from the wearable device 7 to the user device 1 (and in other examples to any apparatus performing block 150 of method 100).

At sub-block 154 the data obtained from the one or more sensors 9 of the wearable device 7 (e.g., the position 153 of the wearable device 7) is compared with the determined position 152 of the wearable device 7 (from sub-block 151) to determine data 155 that enables calibration of one or more sensors 9 of the wearable device 7.

In this example, the data 155 represents the deviation of position 153 from position 152 and is considered to be the error in position 153.

In response to block 160 of method 100, the data 155 is transmitted 162 to the wearable device 7.

In some examples method 100 can continue at the wearable device 7 with block 170. At block 170 the one or more sensors 9 are calibrated using the data 155.

Although not shown, it is to be appreciated that the data 155 that enables calibration of one or more sensors 9 of the wearable device 7 can comprise the position 152 determined at sub-block 151. In such examples, data from the one or more sensors 9 of the wearable device 7 (e.g., the position 153 of the wearable device 7) need not be transmitted to the user device 1 and the comparison of sub-block 154 between the position 152 and the position 153 need not take place at the user device 1. The position 152 can be transmitted to the wearable device 7 and used directly in the calibration of the one or more sensors 9.

Though block 150 of method 100 is shown in the example of FIG. 8 to be performed at the user device 1, it is to be appreciated that each of the blocks of method 100 (bar block 170) can be performed by an apparatus 200 which may be separate to, comprised in, or embodied by the user device 1.

FIG. 9 illustrates an example of an apparatus 200. The apparatus 200 may be a chip or a chip-set.

In the example of FIG. 9 the apparatus 200 comprises a controller 210. Implementation of a controller 210 may be as controller circuitry. The controller 210 may be implemented in hardware alone, have certain aspects in software including firmware alone or can be a combination of hardware and software (including firmware).

As illustrated in FIG. 9 the controller 210 may be implemented using instructions that enable hardware functionality, for example, by using executable instructions of a computer program 240 in a general-purpose or special-purpose processor 220 that may be stored on a computer readable storage medium (disk, memory etc) to be executed by such a processor 220.

The processor 220 is configured to read from and write to the memory 230. The processor 220 may also comprise an output interface via which data and/or commands are output by the processor 220 and an input interface via which data and/or commands are input to the processor 220.

The memory 230 stores a computer program 240 comprising computer program instructions (computer program code) that controls the operation of the apparatus 200 when loaded into the processor 220. The computer program instructions, of the computer program 240, provide the logic and routines that enables the apparatus to perform the methods illustrated in FIG. 2 and as otherwise described with reference to FIGS. 2 through 8. The processor 220 by reading the memory 230 is able to load and execute the computer program 240.

The apparatus 200 therefore comprises:

at least one processor 220; and at least one memory 230 including computer program code the at least one memory 230 and the computer program code configured to, with the at least one processor 220, cause the apparatus 200 at least to perform:

obtaining 110 a position 111 of a user device 1;

locating 120 one or more surfaces 17 providing one or more putative reflection points 19 for a non-line-of-sight path 21 between the user device 1 and a wearable device 7;

conditional upon locating the one or more surfaces 17, causing 130 ranging signals to be exchanged between the user device 1 and the wearable device 7 to determine 140 a relative position 149 of the wearable device 7 with respect to the user device 1;

determining 150, from at least the relative position 149 and position 111 of the user device 1, data 155 that enables calibration 170 of one or more sensors 9 of the wearable device 7; and causing 160 transmission 162 of the data 155 to the wearable device 7.

As illustrated in FIG. 10, the computer program 240 may arrive at the apparatus 200 via any suitable delivery mechanism 250. The delivery mechanism 250 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 240. The delivery mechanism may be a signal configured to reliably transfer the computer program 240. The apparatus 200 may propagate or transmit the computer program 240 as a computer data signal.

Computer program instructions for causing an apparatus to perform at least the following or for performing at least the following:

obtaining 110 a position 111 of a user device 1;

locating 120 one or more surfaces 17 providing one or more putative reflection points 19 for a non-line-of-sight path 21 between the user device 1 and a wearable device 7;

conditional upon locating the one or more surfaces 17, causing 130 ranging signals to be exchanged between the user device 1 and the wearable device 7 to determine 140 a relative position 149 of the wearable device 7 with respect to the user device 1;

determining 150, from at least the relative position 149 and position 111 of the user device 1, data 155 that enables calibration 170 of one or more sensors 9 of the wearable device 7; and causing 160 transmission 162 of the data 155 to the wearable device 7.

The computer program instructions may be comprised in a computer program, a non-transitory computer readable medium, a computer program product, a machine readable medium. In some but not necessarily all examples, the computer program instructions may be distributed over more than one computer program.

Although the memory 230 is illustrated as a single component/circuitry it may be implemented as one or more separate components/circuitry some or all of which may be integrated/removable and/or may provide permanent/semi-permanent/dynamic/cached storage.

Although the processor 220 is illustrated as a single component/circuitry it may be implemented as one or more separate components/circuitry some or all of which may be integrated/removable. The processor 220 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIG. 2 and as otherwise described with reference to FIGS. 2 through 8 may represent steps in a method and/or sections of code in the computer program 240. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

Consequently, in some examples, the apparatus 200 comprises means for:
obtaining 110 a position 111 of a user device 1;
locating 120 one or more surfaces 17 providing one or more putative reflection points 19 for a non-line-of-sight path 21 between the user device 1 and a wearable device 7;
conditional upon locating the one or more surfaces 17, causing 130 ranging signals to be exchanged between the user device 1 and the wearable device 7 to determine 140 a relative position 149 of the wearable device 7 with respect to the user device 1;
determining 150, from at least the relative position 149 and position 111 of the user device 1, data 155 that enables calibration 170 of one or more sensors 9 of the wearable device 7; and
causing 160 transmission 162 of the data 155 to the wearable device 7.

The means may also be configured to perform other features of method 100 described with reference to FIGS. 2 to 8.

As described in the foregoing the performance of blocks of method 100 can be distributed between the user device 1, wearable device 7, and, in some examples, the apparatus 200. Therefore, there is provided, according to examples of this disclosure, a system comprising: a user device 1 having one or more sensors 3 configured to determine a position 111 of the user device 1; a wearable device 7 having one or more sensors 9; and means for:
locating 120 one or more surfaces 17 providing one or more putative reflection points 19 for a non-line-of-sight path 21 between the user device 1 and the wearable device 7;
conditional upon locating the one or more surfaces 17, exchanging ranging signals between the user device 1 and the wearable device 7 to determine 140 a relative position 149 of the wearable device 7 with respect to the user device 1;
determining 150, from at least the relative position 149 and position 111 of the user device 1, data 155 that enables calibration 170 of the one or more sensors 9; and calibrating 170 the one or more sensors 9 using the data 155.

The above-described examples find application as enabling components of:
automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

By way of further example, the method 100, apparatus 200, or system hereinbefore described may be used to enable a spatial audio navigation application. In such application, the wearable device 7 can be a hearable configured to reproduce spatial audio which a user perceives as coming from specific points in three-dimensional space relative to their head. Navigation instructions are to be reproduced from specific points correlated with the instructed directions. However, the internal sensors 9 of the hearable, being in this instance one or more IMUs, do a poor job at relating these specific points to the external, real-world. The user device 1 locates nearby vertical surfaces, such as walls of nearby buildings, via reflection at which ranging signals can be exchanged in order to more accurately map the hearable to the external, real-world. As a result of the more accurate mapping, the hearables are able to generate spatial audio navigation instructions which allow the user to navigate in an intuitive and hands-free manner. The wearable device 7 could also or alternatively comprise a head mounted display (HMD) for example as embodied in smartglasses. The HMD can generate augmented reality navigation instructions in which a visual scene of a physical real environment is supplemented by one or more visual elements representing the navigation instructions and being rendered to the user via the HMD.

By way of further example, the method 100, apparatus 200, or system hereinbefore described may be used to enable an augmented shopping application. In such application, the wearable device 7 can be a hearable configured to reproduce spatial audio which a user perceives as coming from specific points in three-dimensional space relative to their head. A store in which the user is shopping makes available a spatial database of its internal layout and products. This may be in the form of a digital map. The user device 1 uses reflections from, for example, the shelves and/or walls of the store, to accurately map the hearable to the external, real-world. Thus, the user's gaze direction can be accurately determined and, combined with knowledge of product locations retrieved from the spatial database, product information, offers, and answers to spoken questions are enabled for the products the user looks at by way of spatial audio output from the hearable. The wearable device 7 could also or alternatively comprise a HMD, again for example as embodied in smartglasses. The HMD can generate augmented reality content in which a visual scene of a physical real environment is supplemented by one or more visual elements representing the product information, offers, and answers and being rendered to the user via the HMD.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
    at least one processor; and
    at least one memory including computer program code,
    the at least one memory storing instructions that, when executed by the at least one processor, cause the apparatus at least to:
    obtain a position of a user device;
    locate a surface providing a reflection point for a non-line-of-sight (NLOS) path between the user device and a wearable device;
    cause ranging signals to be exchanged between the user device and the wearable device to determine a relative position of the wearable device with respect to the user device;
    determine, from at least the relative position and the position of the user device, data for calibration of one or more sensors of the wearable device; and
    cause transmission of the data to the wearable device.

2. An apparatus according to claim 1, wherein locating the surface comprises detection of and ranging to the surface using a pulsed signal.

3. An apparatus according to claim 1, wherein locating the surface comprises querying a database comprising spatial data.

4. An apparatus according to claim 1, wherein the at least one memory and the instructions stored therein are configured to, with the at least one processor, further cause the apparatus to: based on a determination that a line-of-sight (LOS) communication between the user device and the wearable device is unavailable, locate the surface.

5. An apparatus according to claim 1, wherein responsive to the user device being located at a first position such that no surface providing a reflection point for a NLOS path between the user device and the wearable device is located, the at least one memory and the instructions stored therein are configured to, with the at least one processor, further cause the apparatus to: provide guidance to a user indicating one or more user positions at which one or more surfaces are expected to provide one or more reflection points for one or more NLOS paths between the user device and the wearable device.

6. An apparatus according to claim 1, wherein the at least one memory and the instructions stored therein are configured to, with the at least one processor, further cause the apparatus to: restrict attempts to locate the surface during an interval between no surface providing a reflection point for a NLOS path between the user device and the wearable device being located, and a change in user position.

7. An apparatus according to claim 1, wherein the ranging signals comprise pulses with a repetition rate configured to reduce overlap of NLOS path responses to successive pulses in received signals.

8. An apparatus according to claim 1, wherein the at least one memory and the instructions stored therein are configured to, with the at least one processor, further cause the apparatus to: based on at least a NLOS path length and respective positions of one or more reflection points in the NLOS path, determine the relative position of the wearable device with respect to the user device.

9. An apparatus according to claim 1, wherein the at least one memory and the instructions stored therein are configured to, with the at least one processor, further cause the apparatus to: process received signals to identify a component, indicative of a NLOS path response to a transmitted ranging signal, on which to perform ranging calculations to determine an NLOS path length.

10. An apparatus according to claim 1, wherein the at least one memory and the instructions stored therein are configured to, with the at least one processor, further cause the apparatus to: process received signals to determine an angle of arrival associated with a component indicative of a NLOS path response to a transmitted ranging signal; and determine respective positions of one or more reflection points in a NLOS path based on the determined angle of arrival and the located surface.

11. An apparatus according to claim 1, wherein the at least one memory and the instructions stored therein are configured to, with the at least one processor, further cause the apparatus to: cause ranging signals to be exchanged between the user device and a further wearable device to determine a relative position of the further wearable device with respect to the user device, wherein the wearable device has a known or expected positional relationship with the further wearable device.

12. An apparatus according to claim 1, wherein the at least one memory and the instructions stored therein are configured to, with the at least one processor, further cause the apparatus to: obtain position data from the one or more sensors of the wearable device to determine error in the obtained position data from the one or more sensors of the wearable device using at least the relative position of the wearable device with respect to the user device and the position of the user device.

13. An apparatus according to claim 1, wherein the apparatus is the user device.

14. An apparatus according to claim 13, wherein the user device further comprises a transceiver.

15. A system comprising:
a user device having one or more sensors configured to determine a position of the user device;
a wearable device having one or more sensors;
at least one processor; and
at least one memory including computer program code, the at least one memory storing instructions that, when executed by the at least one processor, cause:
locating a surface providing a reflection point for a non-line-of-sight path between the user device and the wearable device;
exchanging ranging signals between the user device and the wearable device to determine a relative position of the wearable device with respect to the user device;
determine, from at least the relative position and the position of the user device, data for calibration of the one or more sensors of the wearable device; and
calibrating the one or more sensors of the wearable device using the data.

16. A method comprising:
obtaining a position of a user device;
locating a surface providing a reflection point for a non-line-of-sight (NLOS) path between the user device and a wearable device;
causing ranging signals to be exchanged between the user device and the wearable device to determine a relative position of the wearable device with respect to the user device;
determining, from at least the relative position and position of the user device, data for calibration of one or more sensors of the wearable device; and
causing transmission of the data to the wearable device.

17. The method of claim 16, wherein locating the surface comprises detection of and ranging to the surface using a pulsed signal.

18. A non-transitory computer readable medium comprising program instructions stored thereon for causing an apparatus to perform at least the following:
obtain a position of a user device;
locate a surface providing a reflection point for a non-line-of-sight (NLOS) path between the user device and a wearable device;
cause ranging signals to be exchanged between the user device and the wearable device to determine a relative position of the wearable device with respect to the user device;
determine, from at least the relative position and position of the user device, data for calibration of one or more sensors of the wearable device; and
cause transmission of the data to the wearable device.

19. The non-transitory computer readable medium of claim 18, wherein locating the surface comprises detection of and ranging to the surface using a pulsed signal.

20. The non-transitory computer readable medium of claim 18, wherein locating the surface comprises querying a database comprising spatial data.

* * * * *